United States Patent
Borrell et al.

(10) Patent No.: US 8,328,304 B2
(45) Date of Patent: Dec. 11, 2012

(54) CHANGING PRINTMODES ACCORDING TO OBJECTIVE

(75) Inventors: Maria Isabel Borrell, Barcelona Manresa (ES); Sergio Puigardeu, Barcelona (ES); Luis Garcia, Les Roquetes Barcelona (ES); Marc Serra, Barcelona (ES)

(73) Assignee: Hewlett-Packard Development Company, L.P., Houston, TX (US)

(*) Notice: Subject to any disclaimer, the term of this patent is extended or adjusted under 35 U.S.C. 154(b) by 323 days.

(21) Appl. No.: 12/769,111

(22) Filed: Apr. 28, 2010

(65) Prior Publication Data
US 2011/0267392 A1 Nov. 3, 2011

(51) Int. Cl.
*B41J 29/38* (2006.01)

(52) U.S. Cl. .................... 347/5; 347/14; 347/16
(58) Field of Classification Search ............ 347/5, 9, 347/14, 16, 19
See application file for complete search history.

(56) References Cited

U.S. PATENT DOCUMENTS

| 6,257,693 | B1 | 7/2001 | Miller et al. |
| 7,339,686 | B1 | 3/2008 | Ward et al. |
| 2005/0168507 | A1* | 8/2005 | Ide et al. ............ 347/12 |
| 2006/0066647 | A1* | 3/2006 | Koga et al. ............ 347/5 |

FOREIGN PATENT DOCUMENTS

| JP | 59038071 A | 3/1984 |
| JP | 2003011458 A | 1/2003 |
| JP | 2004259005 A | 9/2004 |
| JP | 2005007661 A | 1/2005 |

* cited by examiner

*Primary Examiner* — Lam S Nguyen
(74) *Attorney, Agent, or Firm* — Garry A. Perry

(57) ABSTRACT

In one embodiment, a plot width for an image to be printed is determined. A carriage return time that is a function of the plot width and a first carriage speed in a first printmode is calculated. A change is made from the first printmode to a second printmode according to an objective if the carriage return time is less than a media advance time.

20 Claims, 10 Drawing Sheets

CHANGING PRINTMODES ACCORDING TO OBJECTIVE

BACKGROUND

Variables that can be considered when selecting a printing mode for a print job are image quality and speed of printing. Some printmodes achieve high quality printing by utilizing unidirectional printing, e.g. a printmode in which a printhead may eject ink as a carriage that holds the printhead it travels in a first direction, but does not eject ink as the carriage returns traveling in a reverse second direction. Drops ejected by a printhead during unidirectional printing will fall on the media in the same direction and order. Other printmodes achieve a fast printing speed by utilizing bidirectional printing, e.g. a printmode in which a printhead may eject ink as the carriage travels in both a first direction and a reverse second direction.

BRIEF DESCRIPTION OF THE DRAWINGS

The accompanying drawings illustrate various embodiments and are a part of the specification. The illustrated embodiments are merely examples and do not limit the scope of the claims. Throughout the drawings, identical reference numbers designate similar, but not necessarily identical elements.

The same part numbers designate the same or similar parts throughout the figures.

DETAILED DESCRIPTION OF EMBODIMENTS

A user of a printer is in some situations asked to select a level of quality desired (e.g. fast, normal, best), and after user input a printmode is assigned to define how the plot is printed. Users may make printmode selections with an assumption that choosing a productivity option (e.g. a "fast" printmode) will result in a plot being printed faster but with a corresponding sacrifice in quality, and/or that choosing a quality option (e.g. "normal" or "best") will result in the plot being printed with high quality but with a corresponding sacrifice in printing speed. While this assumption may be true in some cases, it is incorrect in others. For example, depending upon the speed of the carriage and width of the swath to be printed, the time to advance the paper can in some situations be longer than the time during which the carriage retraces to the beginning of the swath. In such a situation, a user choosing a printmode is faced with several variables to consider and such user can easily make an incorrect printmode choice relative to his/her needs. Uncertainty as to which printmode is optimal may lead to a user guessing and making incorrect choices as to printmode settings. Embodiments described below were developed in an effort to provide a method and system to change from a first printmode to a second printmode according to an objective if a carriage return time is less than a media advance time.

The following description is broken into sections. The first, labeled "Environment", describes an example environment in which embodiments may be implemented. The second section, labeled "Components", describes various physical and logical components utilized to implement various embodiments. The third section, labeled as "Operation", describes steps taken to implement various embodiments. The fourth section, labeled "Example", describes examples of changing printmodes according to an objective.

Figure 1:
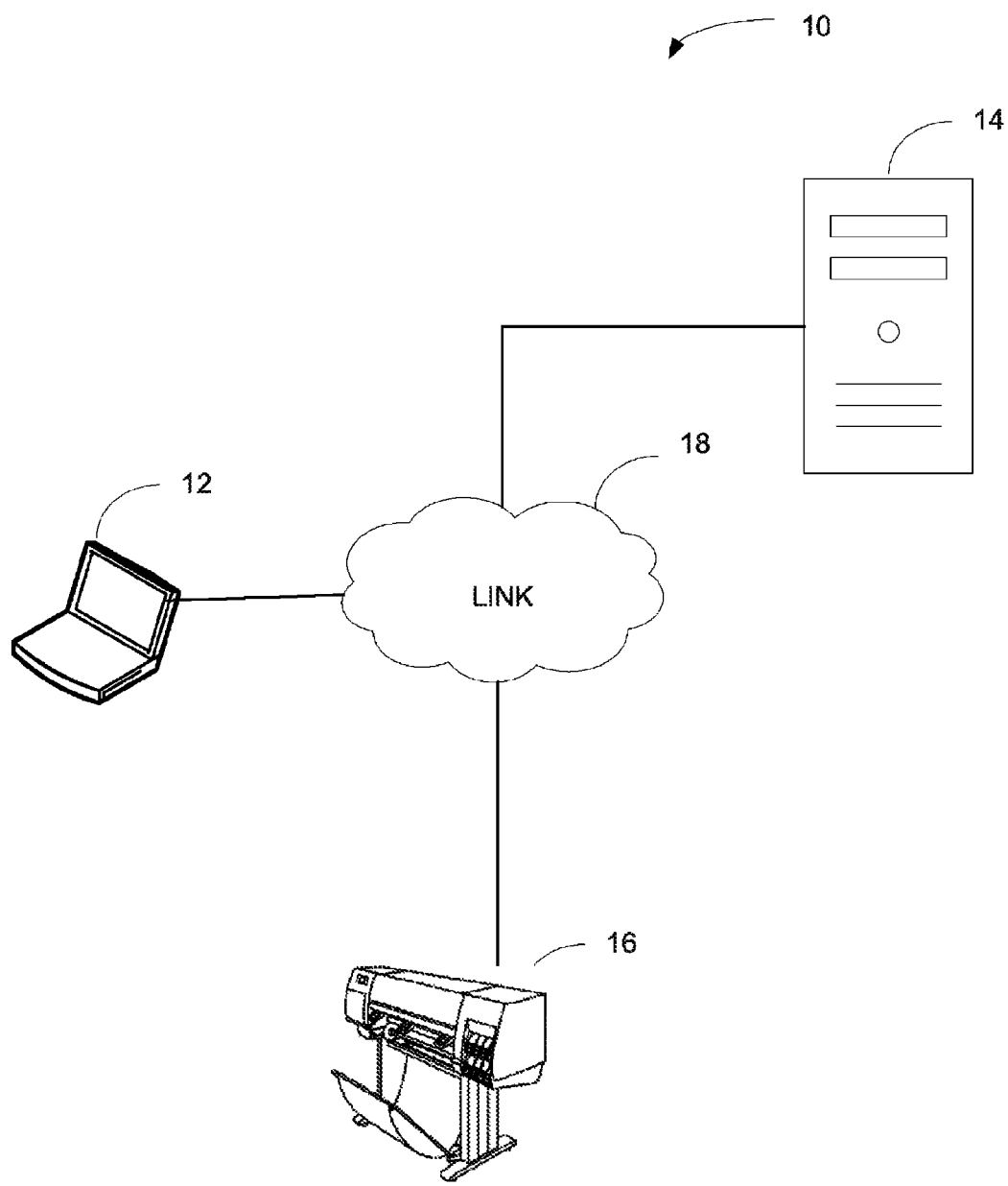
FIG. 1 depicts an example environment in which various embodiments may be implemented.

ENVIRONMENT: FIG. 1 depicts an example environment 10 in which various embodiments may be implemented. Environment 10 is shown to include a client 12, server 14, and a printer 16 interconnected via link 18.

Client 12 represents generally any computing device capable of receiving content from, and sending content to a server 14 and/or printer 16 via a link 18. Client 12 is also responsible for receiving and processing responses to requests for content. As used in this specification and the appended claims, "processing" includes executing instructions in memory to perform some transformation and/or computation on data in the computing device's memory. Processing may include displaying visual content such as text, images, and motion video on a monitor as well as broadcasting audio content via one or more speakers. Example client devices include desktop computers, laptop computers, smart phones, cell phones, personal digital assistants, net-books, digital media players, and the like.

Server 14 represents generally any computing device capable of serving content to, and receiving content from, a client 12 and/or a printer 16 via link 18. The term content refers to visual and audible information that can be presented to and received from a user of a client 12. Examples include text, still, images, audio, and video. Content can also include instructions designed to be processed by a client 12. Examples include HTML code and various scripts. As discussed with reference to FIG. 5 below, server 14 may be a print server operable to receive a print fulfillment request and/or content from a client 12 and in response cause a printer 16 to produce printed output.

Printer 16 represents generally any device operable to receive and process responses to requests to print content from client 12 and/or server 14, and to produce printed output.

Link 18 represents generally one or more of a cable, wireless, fiber optic, or remote connection via a telecommunication link, an infrared link, a radio frequency link, or any other connector or system that provides electronic communication. Link 18 may represent an intranet, the internet, or a combination of both. The paths followed by link 18 between client 12, server 14 and printer 16 as depicted in FIG. 1 represent the logical communication paths between these devices, not necessarily the physical paths between the devices.

Figure 2:
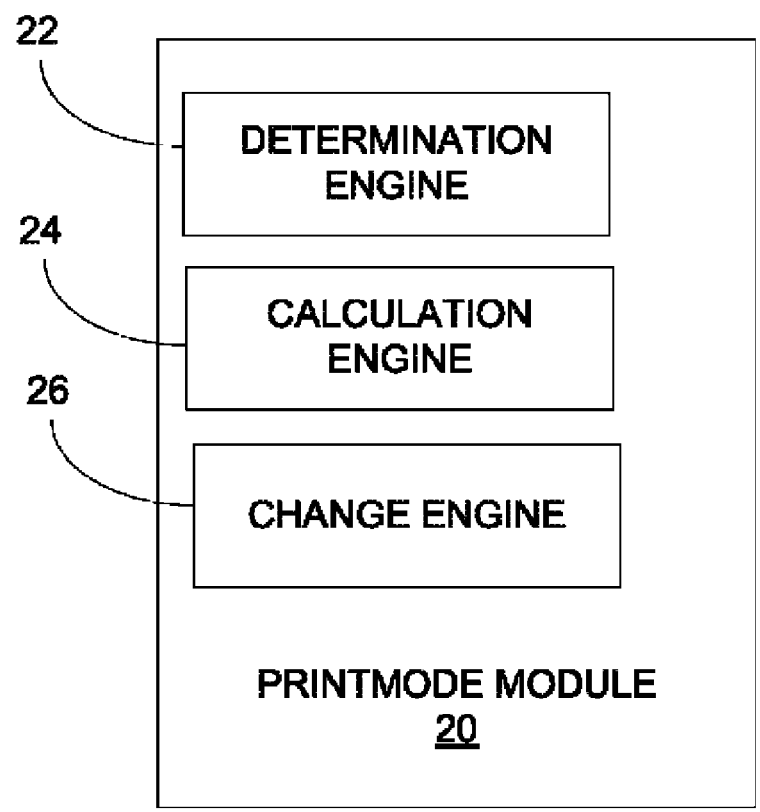
FIG. 2 depicts an example printmode module according to an embodiment.

COMPONENTS: FIG. 2 depicts an example of a printmode module 20. Printmode module 20 represents generally any combination of hardware and programming configured for use in changing printmodes according to an objective. In the example of FIG. 2, printmode module 20 is shown to include a determination engine 22, a calculation engine 24 and a change engine 26.

Determination engine 22 represents generally any combination of hardware and programming configured to determine a plot width for an image to be printed. As used in this specification and the appended claims, a "plot width" includes a distance from a side edge of an image to an opposite side edge of the image when printed. In example, if a print job is sent to a printer with instructions to print an image on 8½×11 inch media such that the distance between the left and right edges of the image will be four inches, the plot width is four inches. In an embodiment, the plot width determination correlates with specific passes of a printhead carriage.

Calculation engine 24 represents generally any combination of hardware and programming configured to calculate a carriage return time that is a function of the plot width and a first carriage speed in a first printmode. As used in this specification and the appended claims, a "carriage speed" includes a speed that a carriage holding one or more printheads travels along a rail or other support during a printing operation. As used in this specification and the appended claims, a "printmode" includes a defined configuration of settings and functions designed to meet specific printing needs. In an embodiment, a printmode may include unidirectional printing, wherein a printhead ejects ink as the carriage that holds the printhead travels in a first direction, and does not eject ink as the carriage returns traveling in a second direction. In an embodiment, a printmode may include bidirectional printing, wherein a printhead ejects ink as the carriage travels in a first direction and also as the carriage returns in a reverse second direction. A plot that is determined by determination engine 22 may be utilized in the calculation of a carriage return time. In an embodiment, a carriage speed may be established from specifications provided by a printer manufacturer. In an embodiment, carriage speed may be determined utilizing a sensor that is configured to measure carriage speed within the printer. In an embodiment, the function to determine carriage return time for a carriage pass comprises:

carriage return time=carriage speed×plot width.

In an example calculation according to this embodiment, if carriage speed is 0.02 seconds/inch and plot width is 10 inches, the calculated carriage return time is 0.2 seconds.

Change engine 26 represents generally any combination of hardware and programming configured to change from a first printmode to a second printmode according to an objective if carriage return time is less than a media advance time. As used in this specification and the appended claims, a "media advance time" includes a time during which a printer advances a media from a first position, after conclusion of a first carriage printing pass, to a second position such that the print media is in a position to be printed upon via a second carriage printing pass. Employing a large printhead, or a printhead/carriage configuration wherein multiple printheads are arranged side by side on a carriage to maximize the swath width, may result in large swath areas and hence long media advance times. If it is determined that the printer's carriage return time is less than the media advance time, it is possible to change printmodes in order to utilize this time differential so as to meet an objective. As used in this specification and the appended claims, an "objective" includes a stated purpose to be pursued during any time differential created as a result of carriage return time being less than media advance time. An example of such an objective is prioritization of image quality. Another example of an objective is prioritization of printing speed. In embodiments, the objective may be received from a user or an administrator via a user interface. In an embodiment, the objective may be pre-populated as a program objective.

In an example, a printer may include a carriage that holds two printheads arranged side by side in a staggered configuration that maximizes a printing swath. Based on manufacturer specifications, it may be known that a media advance time for this carriage/printhead configuration is 0.6 seconds. Continuing with this example, a calculation engine may determine a carriage return time is 0.2 seconds for a carriage pass based upon a known carriage speed of 0.02 seconds/inch and a plot width of 10 inches. As the 0.2 second carriage return time is less than the 0.6 second media advance time, a first printmode can be changed to a second printmode in accordance with a known printing objective in order to utilize the time differential to fulfill that objective.

In an embodiment, changing from a first printmode to a second printmode may include a change from a printmode that includes bidirectional printing to a printmode that includes unidirectional printing. This change in printmode allows the printer to produce images with increased quality without a sacrifice in printing speed. This change from a bidirectional to a unidirectional printmode due to carriage return time being less than media advance time may be in accordance with a stated objective that that prioritizes image quality over printing speed.

In an embodiment, changing from a first printmode to a second printmode may include utilizing unidirectional printing at a second carriage speed that is faster than the first carriage speed. If the printer's carriage return time is less than the media advance time, this change in printmode allows the printer to leverage the carriage return time/media advance time differential to meet a stated objective that prioritizes printing speed.

In an embodiment, the changing from a first printmode to a second printmode may include utilizing unidirectional printing to print a plurality of passes at the first carriage speed, pausing the carriage after at least one of the plurality of passes for a period not longer than the difference between the carriage return time and the media advance time, and performing a service task during the period. In an embodiment the service task may include various types of printhead servicing such as the priming, spitting, wiping of a printhead. This change in printmode allows the printer to leverage the carriage return time/media advance time differential to meet a stated objective that prioritizes printhead servicing.

In an embodiment, the changing from a first printmode to a second printmode may include utilizing bidirectional printing to print a plurality of passes at the first carriage speed, pausing a carriage after at least one of the plurality of passes for a period not longer than the media advance time, and performing a service task during the period. In an example the carriage may pause after a first pass in which a first swath is printed in a first direction while the media advances, and during the pause time perform printhead servicing. When the media advance is complete printhead servicing terminates and the carriage begins a second pass in a direction opposite to the first pass to print a second swath. This change in printmode allows the printer to leverage the carriage return time/media advance time differential to meet a stated objective that prioritizes printhead servicing.

Figure 3:
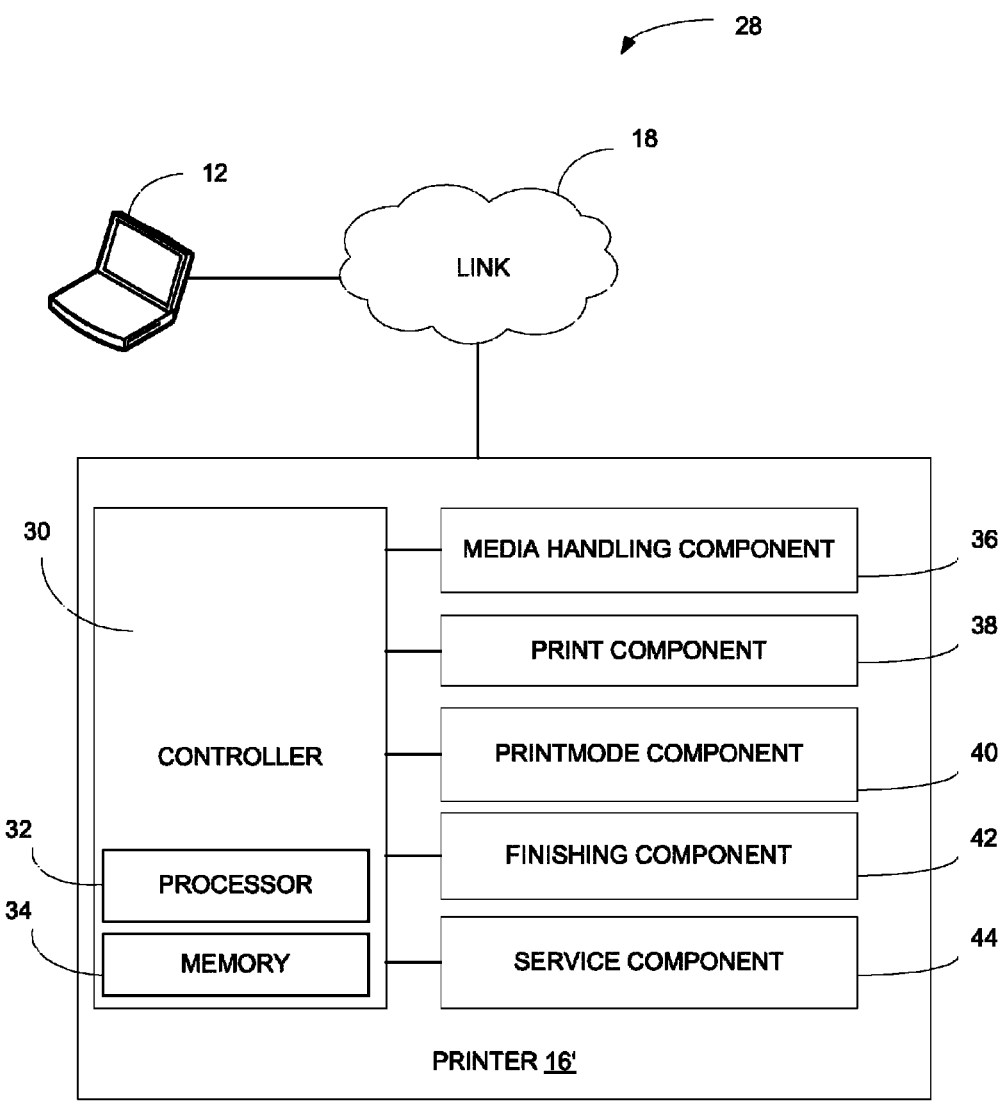
FIG. 3-5 depict implementations of the printmode module of FIG. 2 according to various embodiments.

Printmode module 20 may be implemented in a number of environments, such as environment 28 of FIG. 3. Environment 28 includes client 12 and printer 16' interconnected via link 18. Printer 16' is shown to include a media handling component 36, a print component 38, a printmode component 40, a finishing component 42, a service component 44, and a controller 30.

Media handling component 36 represents generally any combination of hardware and programming capable of transporting media through the printer 16'. Print component 38 represents generally any combination of elements capable of being utilized to form desired images on media. Media may include sheets, a continuous roll or web, or any other media on which a print image can be formed. In a given example, print component 38 may include a fluid ejection mechanism, each fluid ejection mechanism including multiple printheads configured to dispense ink or other fluid. As used in this specification and the appended claims, "printhead" includes a mechanism having a plurality of nozzles through which ink or other fluid is ejected. Examples of printheads are drop-on-demand inkjet printheads, thermo resistive printheads, piezo and resistive printheads. Some printheads may be part of a cartridge which also stores the fluid to be dispensed. Other printheads are standalone and are supplied with fluid by an off-axis ink supply. Finishing component 42 represents generally any combination of hardware and programming capable of performing a finishing operation on media. Such finishing operations include cutting, folding, laminating or any other action that affects the physical nature of the print medium. Service component 44 represents generally any combination of elements capable of being utilized to service print component 18. Where, for example, print component 38 includes a printhead, service component 44 may be configured to function as a spittoon and an alignment calibrator.

Printmode component 40 represents generally any programming, that, when executed, implements the functionality of the printmode module of FIG. 2. In particular, printmode component 40, when executed by controller 30, is responsible for determining a plot width for an image to be printed, calculating a carriage return time that is a function of the plot width and a first carriage speed in a first printmode, and changing from a first printmode to a second printmode according to an objective if carriage return time is less than a media advance time. In an embodiment, changing from a first printmode to a second printmode may include a change from a printmode that includes bidirectional printing to a printmode that includes unidirectional printing. In an embodiment, changing from a first printmode to a second printmode may include utilizing unidirectional printing at a second carriage speed that is faster than the first carriage speed.

As used in this specification, controller 30 represents generally any combination of elements capable of coordinating the operation of components 36, 38, 40, 42 and 44. In a given implementation, the controller 30 includes a processor 32 and a memory 34. The processor 32 may represent multiple processors, and the memory 34 may represent multiple memories. In an embodiment, the controller 30 may include a number of software components that are stored in a computer-readable medium, such as memory 34, and are executable by processor 32. In this respect, the term "executable" includes a program file that is in a form that can be directly (e.g. machine code) or indirectly (e.g. source code that is to be compiled) performed by the processor 32. An executable program may be stored in any portion or component of memory 34.

Figure 4:
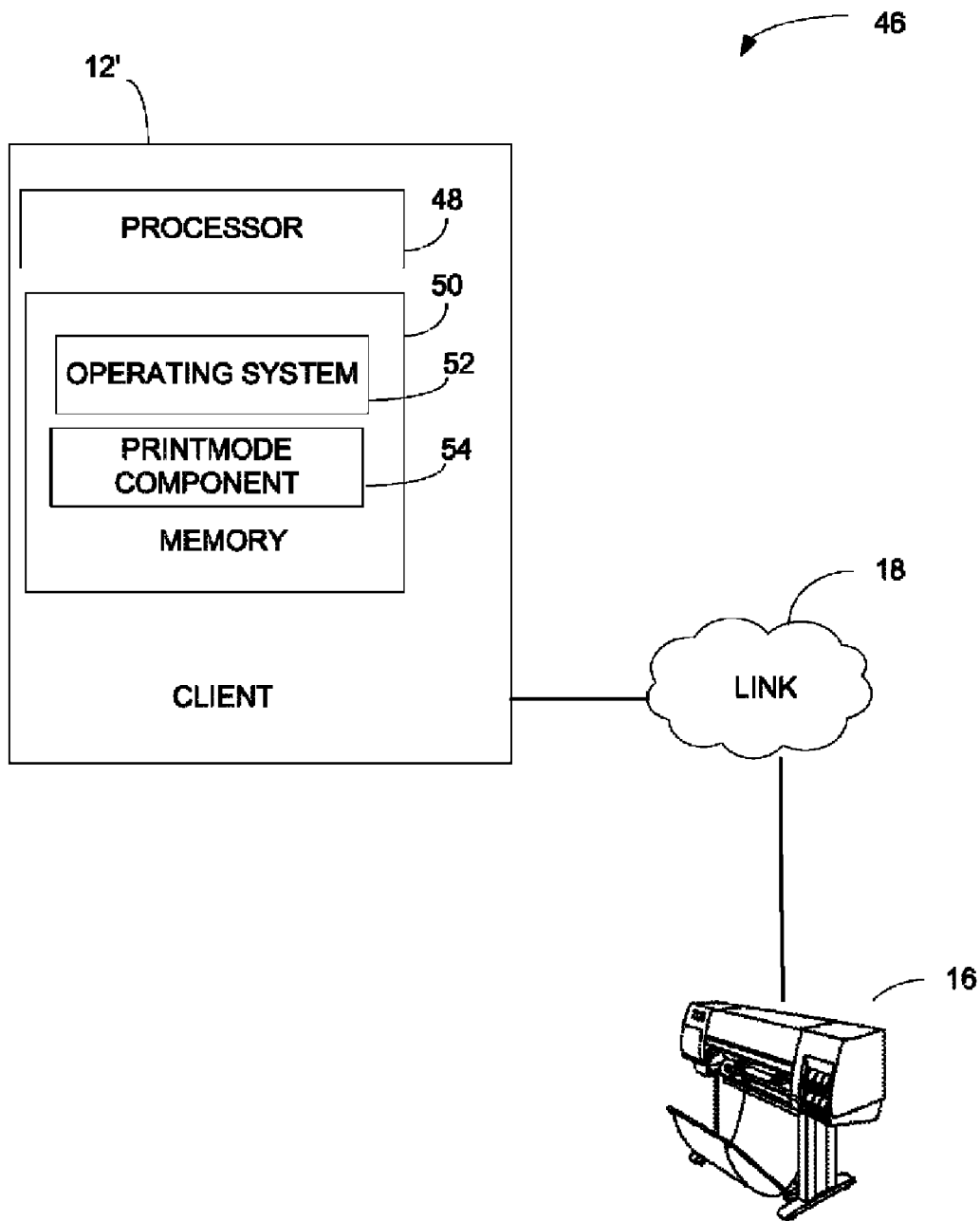

Moving to FIG. 4, an implementation is depicted in which some of the actions taken by printer 16' in FIG. 3 are now taken by client 12'. In particular, a printmode component 54 residing on the client 12' may enable a change from a first printmode to a second printmode according to an objective if a carriage return time is less than a media advance time. Environment 46 includes a client 12', a printer 16 and a link 18. In an embodiment, client 12' may be a laptop computer and is shown to include a processor 48 and memory 50. Processor 48 represents generally any device capable of executing program instructions stored in memory 50. Memory 50 represents generally any memory configured to store program instructions and other data. Memory 50 is shown to include operating system 52, and printmode component 54. Operating system 52 represents generally any software platform on top of which other programs or applications such as the printmode component 54 run.

Printmode component 54 represents generally any programming that, when executed, implements the functionality of the printmode module 20 of FIG. 2. In particular, printmode component 54, when executed by processor 48, is responsible for determining a plot width for an image to be printed, calculating a carriage return time that is a function of the plot width and a first carriage speed in a first printmode, and changing from a first printmode to a second printmode according to an objective if carriage return time is less than a media advance time. In an embodiment, a plot width determination may be made in coordination with a word processing, photo editing or other software application that runs upon client 12', which software application provides for printing a specific image width based upon a media size or a user preference. In an embodiment, determining a plot width may be conducted in coordination with a print driver application that is also executed at client 12', which print driver application may cause an image to be sized to fit a specific media size. In an embodiment, the changing from a first printmode to a second printmode may include utilizing unidirectional printing to print a plurality of passes at the first carriage speed, pausing the carriage after at least one of the plurality of passes for a period not longer than the difference between the carriage return time and the media advance time, and performing a service task during the period. In an embodiment, the changing from a first printmode to a second printmode may include utilizing bidirectional printing to print a plurality of passes at the first carriage speed, pausing a carriage after at least one of the plurality of passes for a period not longer than the media advance time, and performing a service task during the period. In an embodiment, the printmode component 54 may operate as part of or in conjunction with a print driver application that is included within memory 50 and is executed by processor 48.

Printer 16 represents generally any combination of hardware and programming capable of receiving a print job that includes a digital representation of an image from the client 12', directly or indirectly via link 18, and producing printed output that includes a representation of the image on a print medium.

Figure 5:
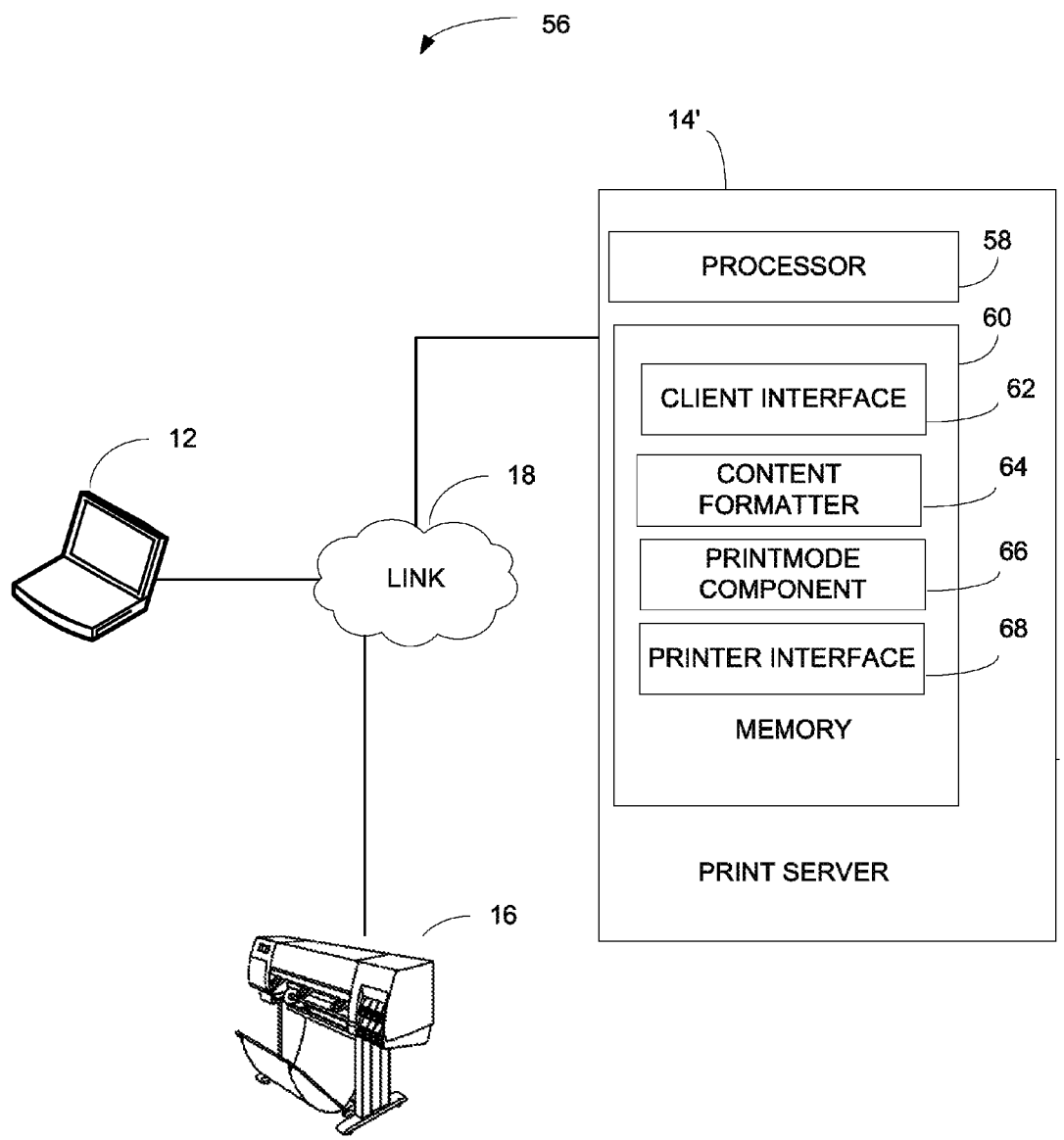

Moving to FIG. 5, an implementation is depicted in which some of the actions taken by printer 16' in FIG. 3 are now taken by a print server 14'. In particular, In particular, client 12 may send a print job directly or indirectly via link 18, to print server 14', and a printmode component 66 residing on the print server 14' may cause the changing of printmodes according to objective and a comparison of carriage return time to media advance time.

Environment 56 includes a client 12, a print server 14', a printer 16, and a link 18. In an embodiment client 12 may be a laptop computing device with Bluetooth®, internet, wireless or wired connectivity to printer 16 and to print server 14' via the link 18. Printer 16 represents generally any combination of hardware and programming capable of receiving a print job from the print server 14' and fulfilling the print job as printed output on a print medium.

In an embodiment, print server 14' is shown to include a processor 58 and memory 60. Processor 58 represents generally any device capable of executing program instructions stored in memory 60. Memory 60 represents generally any memory configured to store program instructions and other data. Memory 60 is shown to include a client interface 62, a content formatter 64, a printmode component 66, and a printer interface 68. Client interface 62 represents generally any combination of hardware and programming capable of receiving a print job from a client 12 or any combination of hardware and software configured to send a print job. Content formatter 64 represents generally any combination of hardware and programming operable to format received content for printing. Such may include formatting the content, as-is, into a format compatible for printing by printer 16. Example formats include Post Script, PDL (Page Description Language), and PDF (Portable Document Format).

Printmode component 66 in combination with print server 14' represent generally any programming that, when executed, implement the functionality of the printmode module 20 of FIG. 2. In particular, printmode component 66, when executed by processor 58, is responsible for determining a plot width for an image to be printed, calculating a carriage return time that is a function of the plot width and a first carriage speed in a first printmode, and changing from a first printmode to a second printmode according to an objective if carriage return time is less than a media advance time. In an embodiment, determining a plot width may occur in coordination with content formatter 64, considering specific passes of a printhead carriage. In an embodiment, changing from a first printmode to a second printmode may be in accordance with an objective that prioritizes image quality over printing speed. In an embodiment, changing from a first printmode to a second printmode may be in accordance with an objective that prioritizes printing speed over image quality. In an embodiment, changing from a first printmode to a second printmode may be in accordance with an objective that prioritizes servicing of a printhead.

Printer interface 68 represents generally a combination of hardware and programming capable of communicating a print job or formatted content to printer 16. Printer interface 68 may be responsible for receiving communications from printer 16 and then using client interface 62 to route the communications back to client 12. Such communications may include an indication that the print job was received, the print job has been printed, any error messages, and any other information related to the print job.

In foregoing discussion, various components were described as combinations of hardware and programming. Such components may be implemented in a number of fashions. In one example, the programming may be processor executable instructions stored on tangible memory media and the hardware may include a processor for executing those instructions. Thus, certain elements operating on the same device may share a common processor and common memory media.

Figure 6:
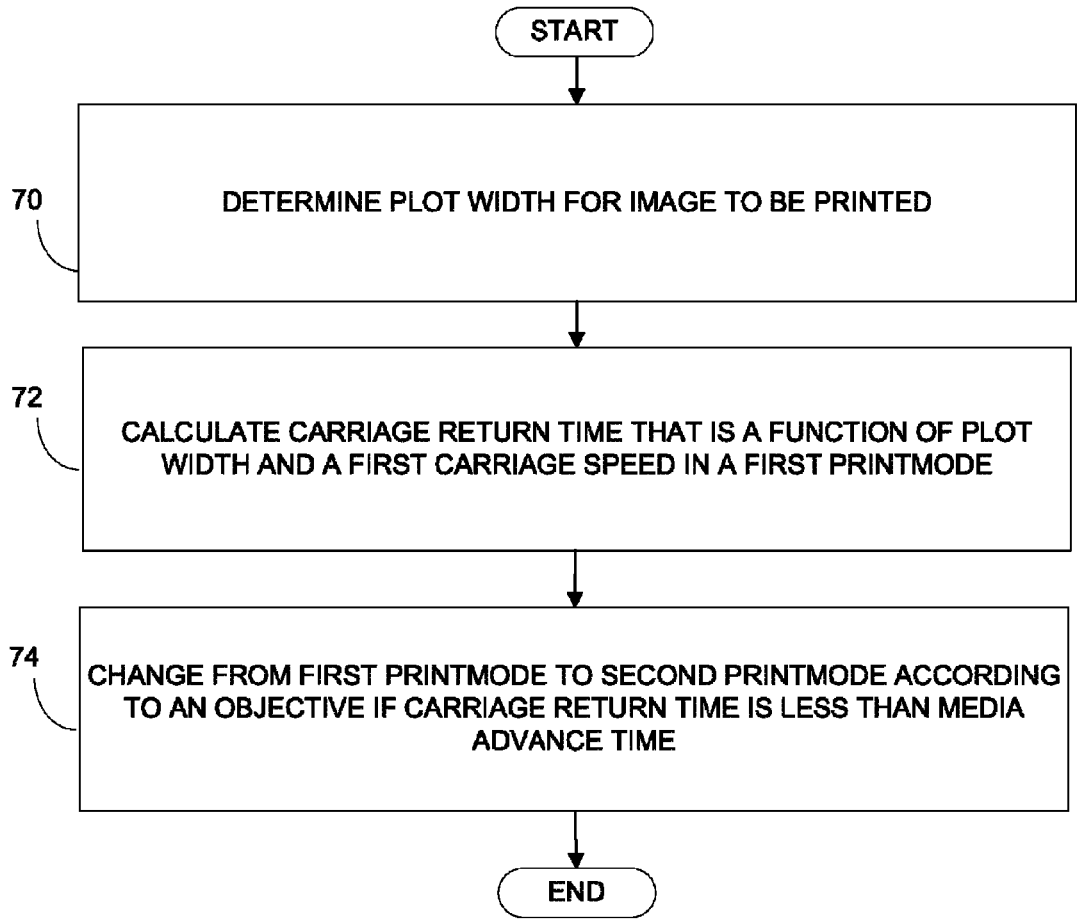
FIGS. 6-7 are flow diagrams depicting steps taken to implement various embodiments.
Figure 7:
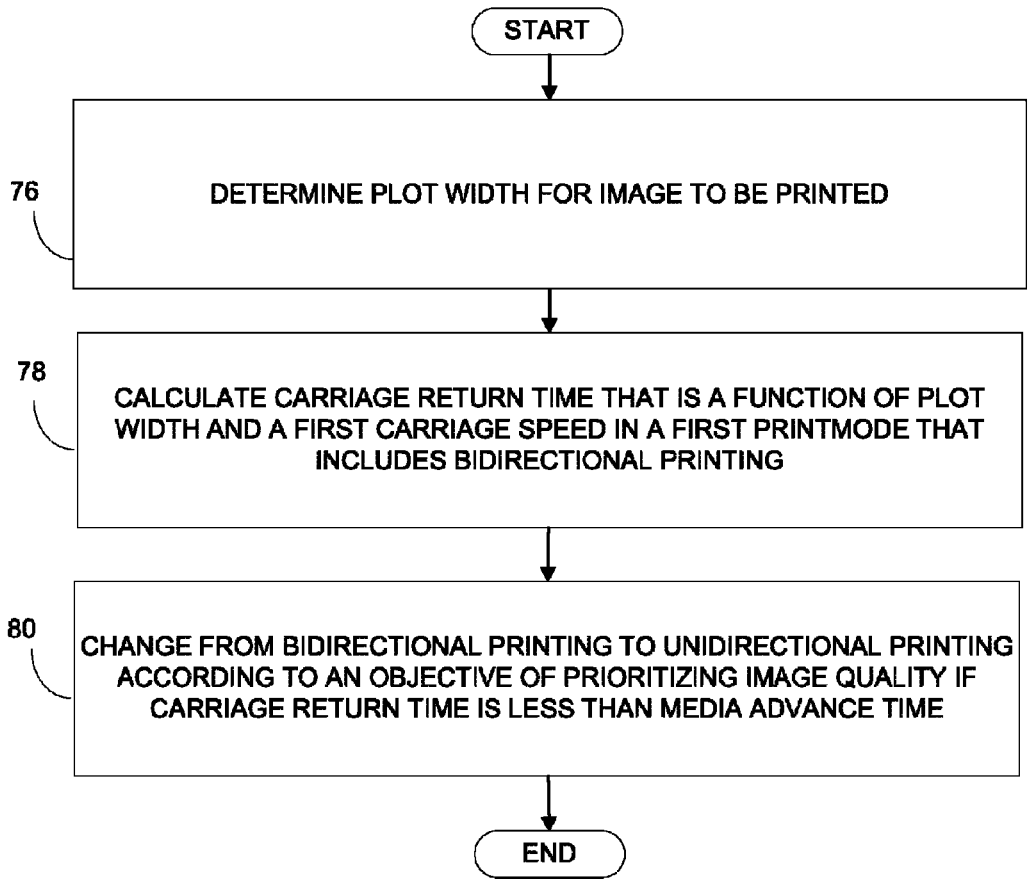

OPERATION: FIGS. 6 and 7 are example flow diagrams of steps taken to implement a change in printmodes according to an objective, in accordance with an embodiment. In discussing FIGS. 6 and 7, reference may be made to the diagrams of FIGS. 1-5 to provide contextual examples. Implementation, however, is not limited to those examples.

Starting with FIG. 6, a plot width is determined for an image to be printed (block 70). Referring back to FIG. 2, the determination engine 22 may be responsible for implementing block 70.

Continuing with the flow diagram of FIG. 6, a carriage return time that is a function of the plot width and a first carriage speed in a first printmode is calculated (block 72). Referring back to FIG. 2, the calculation engine 24 may be responsible for implementing block 72. In an embodiment, a carriage speed may be established from specifications provided by a printer manufacturer. In an embodiment, carriage speed may be determined utilizing a sensor that is configured to measure carriage speed within the printer. In an embodiment, the function to determine carriage return time for a carriage pass comprises:

carriage return time=carriage speed×plot width.

Continuing with the flow diagram of FIG. 6, a change is made from the first printmode to a second printmode according to an objective if the carriage return time is less than a media advance time (block 74). Referring back to FIG. 2, the change engine 26 may be responsible for implementing block 74. In an embodiment, the objective may be received from a user or an administrator via a user interface. In an embodiment, the objective may be pre-populated as a program objective. In examples, the objective may include one of prioritization of image quality, prioritization of printing speed, or prioritization of printhead servicing.

Moving on to FIG. 7, in a particular implementation, a plot width is determined for an image to be printed (block 76). Referring back to FIG. 2, the determination engine 22 may be responsible for implementing block 76. In an embodiment, a plot width determination may be made in coordination with a software application that may provide for printing a specific image width based upon a media size or a user preference. In an embodiment, a plot width determination may be made in coordination with a print driver application that may cause an image to be sized to fit a specific media size.

Continuing with the flow diagram of FIG. 7, a carriage return time that is a function of plot width and a carriage speed in a first printmode that includes bidirectional printing is calculated (block 78). Referring back to FIG. 2, the calculation engine 24 may be responsible for implementing block 78.

Continuing with the flow diagram of FIG. 7, a change is made from bidirectional printing to unidirectional printing, according to an objective of prioritizing image quality, if the calculated carriage return time is less than the media advance time (block 80). Referring back to FIG. 2, the change engine 26 may be responsible for implementing block 80.

EXAMPLES: The diagrams of FIGS. 8, 9, and 10 provide an example implementation of a method to change from a first printmode to a second printmode according to an objective if a carriage return time is less than a media advance time.

Figure 8:
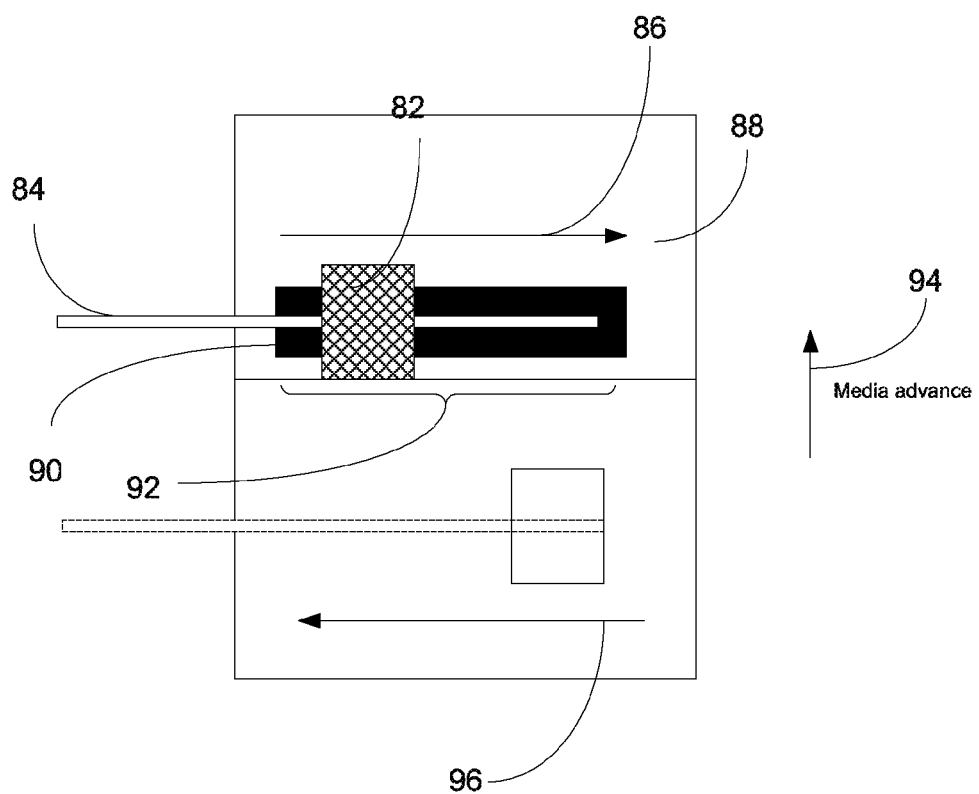
FIGS. 8, 9 and 10 depict examples in which a change from a first printmode to a second printmode is made according to an objective, in accordance with an embodiment.

FIG. 8 illustrates a carriage 82 that holds a printhead (the printhead is not shown), the carriage to travel along a rail 84 in a left to right direction 86 over a print media 88 such that a printhead held by the carriage ejects ink to form an image 90. In this example a plot width 92 of 20.0 inches may be determined for the image to be printed. After the left to right carriage pass, the media advances 94 to a position ready for the next printing pass and the carriage returns in a right to left direction 96. In an embodiment the return carriage pass is a printing pass and the printmode includes bidirectional printing. In an embodiment the return carriage pass is a non-printing pass, and the printmode includes unidirectional printing. If it is known from a manufacturer's specification or a sensor reading that the printer's carriage speed is 0.015 second/inch, a carriage return time of 0.30 seconds can be calculated by applying the function carriage return time=carriage speed×plot width. It may also be known from a manufacturer's specification or sensor reading that the media advance time is 0.60 seconds.

Figure 9:
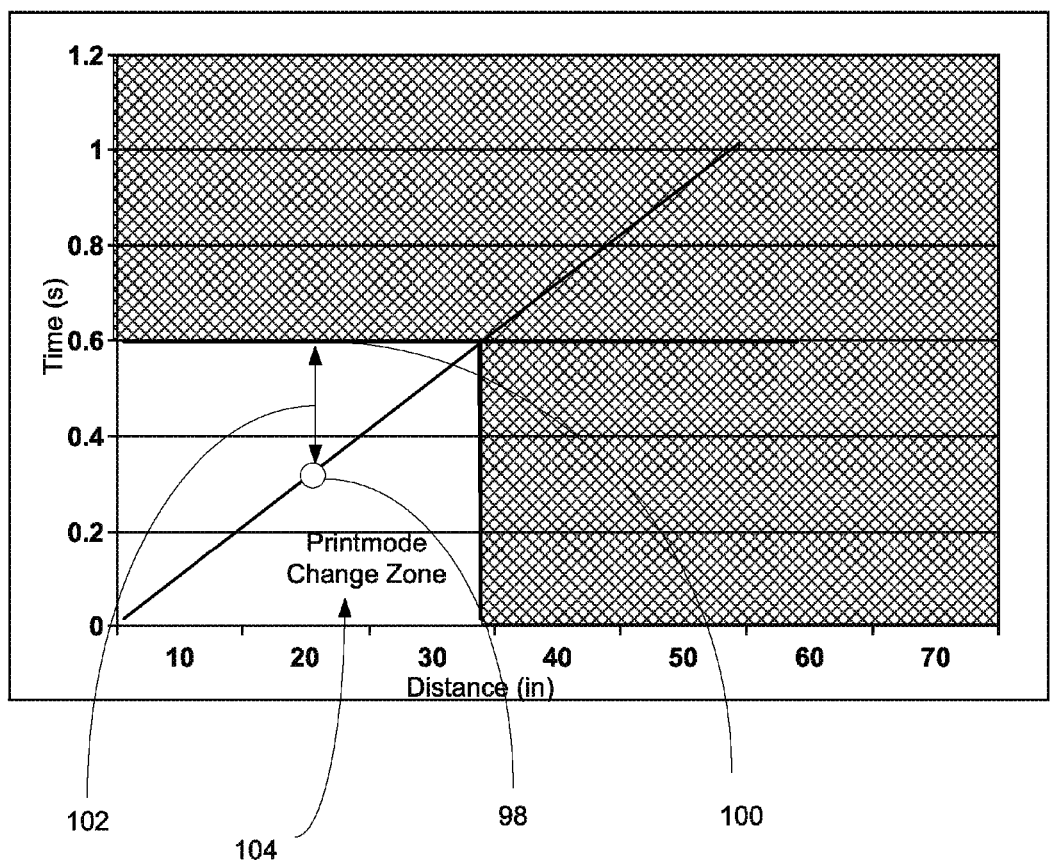

FIG. 9 graphically illustrates that for an example printmode 98 the carriage return time of 0.30 seconds is less than the media advance time 100 of 0.60 seconds, it is therefore possible to change from a first to a second printmodes in accordance with an objective. In this example the objective to be applied to the use of the time differential 102 is one that prioritizes quality, therefore a change is made to a new printmode that utilizes unidirectional printing. The area of the graph that does not have hash marks represents a "change zone" 104 in which a change from a first to a second printmode in accordance with an objective may be made because carriage return time is less than media advance time.

Figure 10:
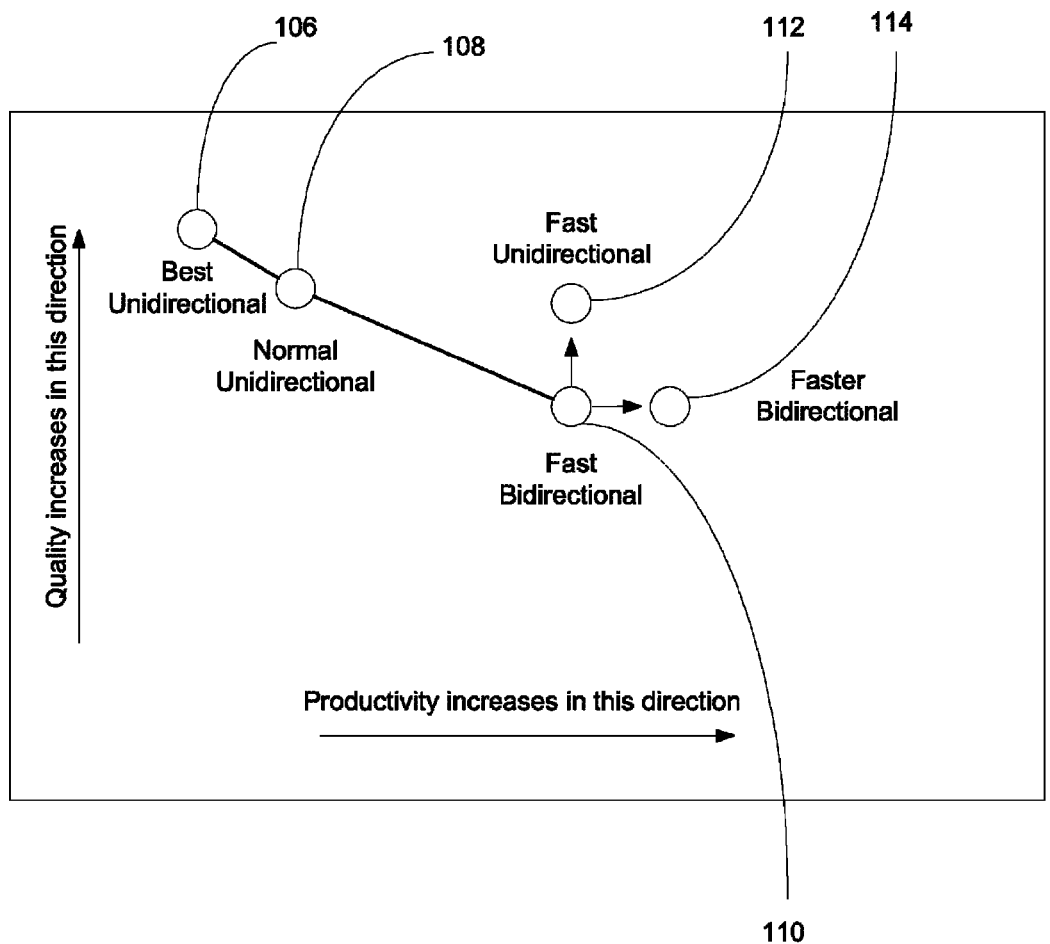

FIG. 10 provides examples of how a first printmode can be changed to a second printmode according to an objective if it is determined that a printer's carriage return time is less than media advance time. FIG. 10 illustrates a "best unidirectional" 106 printmode and a "normal unidirectional" 108 printmode that produce high quality output but are less productive as compared to the "fast" modes. "Fast bidirectional" 110 printmode shows a decrease in quality, but an increase in productivity attributable to its inclusion of bidirectional printing. If it can be determined, after evaluating plot width and carriage speed to calculate a carriage return time, that the carriage return time is less than the media advance time, it is possible to use the time differential in accordance with an objective. If carriage return time is less than media advance time and the objective is one that prioritizes quality, a change can be made from the "fast bidirectional" 110 printmode to a "fast unidirectional" 112 printmode that will produce higher quality output without a sacrifice in productivity. If carriage return time is less than media advance time and the objective is that prioritizes productivity, a change can be made from the "fast bidirectional" 110 to a "faster bidirectional" 114 printmode that utilizes a faster carriage speed and result in higher productivity without a sacrifice in quality relative to the "fast bidirectional" 106 printmode. In another embodiment, the change in printmodes may be in accordance with an objective that prioritizes printhead servicing.

CONCLUSION: The diagrams of FIG. 1 are used to depict an example environment in which various embodiments may be implemented. Implementation, however, is not so limited. FIGS. 2-5 show the architecture, functionality, and operation of various embodiments. Various components illustrated in FIGS. 2-5 are defined at least in part as programs. Each such component, portion thereof, or various combinations thereof may represent in whole or in part a module, segment, or portion of code that comprises executable instructions to implement any specified logical function(s). Each component or various combinations thereof may represent a circuit or a number of interconnected circuits to implement the specified logical function(s).

Also, the present disclosure may be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIGS. 5-6 show specific orders of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present disclosure.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method, comprising:
   determining a plot width for an image to be printed;
   calculating a carriage return time that is a function of the plot width and a first carriage speed in a first printmode; and
   changing from the first printmode to a second printmode according to an objective if the carriage return time is less than a media advance time.

2. The method of claim 1, wherein changing from the first printmode to a second printmode comprises a change from bidirectional printing to unidirectional printing.

3. The method of claim 2, wherein the objective comprises a prioritization of image quality.

4. The method of claim 1, wherein changing from the first printmode to a second printmode comprises utilizing unidirectional printing at a second carriage speed that is faster than the first carriage speed.

5. The method of claim 4, wherein the objective comprises a prioritization of printing speed.

6. The method of claim 1, wherein changing from the first printmode to a second printmode comprises:
   utilizing unidirectional printing to print a plurality of passes at the first carriage speed;
   pausing a printhead after at least one of the plurality of passes for a period not longer than a difference between the carriage return time and the media advance time; and
   performing a service task during the period.

7. The method of claim 1, wherein changing from the first printmode to a second printmode comprises:
   utilizing bidirectional printing to print a plurality of passes at the first carriage speed;
   pausing a printhead after at least one of the plurality of passes for a period not longer than the media advance time; and
   performing a service task during the period.

8. A system, comprising:
   a determination engine operable to determine a plot width for an image to be printed;
   a calculation engine operable to calculate a carriage return time that is a function of the plot width and a first carriage speed in a first printmode; and
   a change engine operable to change from the first printmode to a second printmode according to an objective if the carriage return time is less than a media advance time.

9. The system of claim 8, wherein changing from the first printmode to a second printmode comprises a change from bidirectional printing to unidirectional printing.

10. The system of claim 9, wherein the objective comprises a prioritization of image quality.

11. The system of claim 8, wherein changing from the first printmode to a second printmode comprises utilizing unidirectional printing at a second carriage speed that is faster than the first carriage speed.

12. The system of claim 11 wherein the objective comprises a prioritization of printing speed.

13. The system of claim 8, wherein changing from the first printmode to a second printmode comprises:
   utilizing unidirectional printing to print a plurality of passes at the first carriage speed;
   pausing a printhead after at least one of the plurality of passes for a period not longer than a difference between the carriage return time and the media advance time; and
   performing a service task during the period.

14. The system of claim 8, wherein changing from the first printmode to a second printmode comprises:
- utilizing bidirectional printing to print a plurality of passes at the first carriage speed;
- pausing a printhead after at least one of the plurality of passes for a period not longer than the media advance time; and
- performing a service task during the period.

15. A computer readable medium storing computer executable instructions that when executed implement a method, the method comprising:
- determining a plot width for an image to be printed;
- calculating a carriage return time that is a function of the plot width and a first carriage speed in a first printmode;
- changing from the first printmode to a second printmode according to an objective if the carriage return time is less than a media advance time.

16. The medium of claim 15, wherein changing from the first printmode to a second printmode comprises a change from bidirectional printing to unidirectional printing.

17. The medium of claim 16 wherein the objective comprises a prioritization of image quality.

18. The medium of claim 15 wherein changing from the first printmode to a second printmode comprises utilizing unidirectional printing at a second carriage speed that is faster than the first carriage speed.

19. The medium of claim 18 wherein the objective comprises a prioritization of printing speed.

20. The medium of claim 15, wherein changing from the first printmode to a second printmode comprises:
- utilizing unidirectional printing to print a plurality of passes at the first carriage speed;
- pausing a printhead after at least one of the plurality of passes for a period not longer than a difference between the carriage return time and the media advance time; and
- performing a service task during the period.

* * * * *